United States Patent [19]

Atkin et al.

[11] Patent Number: 4,799,539
[45] Date of Patent: Jan. 24, 1989

[54] THERMALLY EFFICIENT ROOM VENTILATOR

[75] Inventors: Howard S. Atkin, Harrogate; Christopher J. Palmer, Leeds, both of United Kingdom

[73] Assignee: Advanced Design & Manufacture Limited, Bradford, England

[21] Appl. No.: 56,607

[22] Filed: Jun. 1, 1987

Related U.S. Application Data

[63] Continuation-in-part of Ser. No. 836,341, Mar. 5, 1986, abandoned.

[30] Foreign Application Priority Data

May 12, 1985 [GB] United Kingdom ............... 8506415

[51] Int. Cl.⁴ ........................................... F28F 3/00
[52] U.S. Cl. .................................. 165/54; 165/166; 165/904
[58] Field of Search ................. 55/269, 303; 98/33.1; 165/54, 166, 909

[56] References Cited

U.S. PATENT DOCUMENTS

| | | | |
|---|---|---|---|
| 1,529,711 | 3/1925 | Parrott et al. | 98/33.1 |
| 1,825,498 | 9/1931 | Wogan | 165/909 X |
| 1,954,456 | 4/1934 | Morse et al. | 55/269 |
| 2,074,622 | 3/1937 | Sargent et al. | 55/269 |
| 3,666,007 | 5/1972 | Yoshino | 165/909 X |
| 4,134,745 | 1/1979 | Fürstenberg | 55/303 |
| 4,149,590 | 4/1979 | Ospelt | 165/909 X |
| 4,384,611 | 5/1983 | Fung | 165/166 |
| 4,512,392 | 4/1985 | Van Ee et al. | 165/54 |
| 4,557,321 | 12/1985 | von Resch | 165/909 X |

FOREIGN PATENT DOCUMENTS

2713424 9/1978 Fed. Rep. of Germany .
58-31239 2/1983 Japan ................................ 165/54

*Primary Examiner*—Harold Joyce
*Attorney, Agent, or Firm*—Brooks & Kushman

[57] ABSTRACT

A room ventilator for insertion within a wall of window of the room comprises two fans mounted side by side, and a heat exchanger located inwardly of the fans. The construction of the heat exchanger is such that counter flow heat exchange occurs between the incoming and outgoing air streams.

11 Claims, 8 Drawing Sheets

THERMALLY EFFICIENT ROOM VENTILATOR

CROSS REFERENCE TO RELATED APPLICATION

This application is a continuation-in-part of pending prior application Ser. No. 836,341 filed on Mar. 5, 1986 now abandoned in the names of Howard S. Atking and Christopher J. Palmer and entitled THERMALLY EFFICIENT ROOM VENTILATOR.

The present invention relates to a room ventilator and particularly to the type of ventilator which is for mounting within a wall or window of a room and incorporates a heat exchanger.

Room ventilators are well known devices which usually consist of a casing built into an external wall or window of a room. The ventilator incorporates a fan which extracts stale air from the room, fresh air being drawn into the room to replace it via gaps around access doors and windows. The extraction of air in such circumstances provides for the substantial loss of heat which is contained in the extracted air. In addition to the above loss of heat, the extractor units are often noisy and as consequence are generally used only intermittently. There are, in addition to the above, extractor units which contain two fans, the first extracting air from the room whilst the second supplies fresh air from the outside of the building into the room.

With regard to the latter type of unit, it is known to provide, within the ventilator unit, a heat exchanger which enables heat to be transferred from the warm, extracted air to the cooler, fresh air, thus saving energy.

There are three basic types of heat exchanger, those being known as parallel flow, cross flow and counter flow. In a parallel flow heat exchanger, the hot and cold air flows in the same direction along paths which are essentially parallel, and in this type of heat exchanger, the maximum temperature of the cold air can be warmed is the average temperature of the cold and hot air at the entry point of the heat exchanger. In a cross flow heat exchanger the hot and cold air flows in along paths which are inclined with respect to each other, typically at 90°. In a counter flow heat exchanger, the hot and cold air flows in opposite directions along paths which are substantially parallel, and the maximum temperature to which the cold air can be warmed is, theoretically, the temperature of the hot air entering the heat exchanger. Thus the counter flow heat exchanger is the most efficient type, parallel flow the least efficient, and cross flow is of intermediate efficiency.

Because of the physical limitations on the design of a ventilator unit incorporating a heat exchanger which is to fit within a wall or window, the cross flow type of heat exchanger is commonly used. This particular type lends itself to a structure in which the two fans are located side by side, such as the arrangement shown in U.S. Pat. No. 4,557,321 (Von Resch) which utilises a cross flow heat exchanger.

However, as mentioned above, a cross flow heat exchanger has only intermediate efficiency and thus the cold air cannot, even with optimum design, be warmed to a satisfactory temperature for energy-saving purposes.

It is therefore the object of the present invention to provide a ventilator unit which overcomes this disadvantage.

According to one aspect of the present invention there is provided apparatus for extracting stale air from inside a room and introducing fresh air into the room, the apparatus comprising:

an enclosure adapted to be mounted within a wall or window of the room with a first end open to the exterior of the room and a second end open to the interior of the room;

a fresh air inlet and a stale air outlet located at said first end;

a stale air inlet and a fresh air outlet located at said second end;

a first fan located adjacent said fresh air inlet and operable to introduce fresh air into the room; and a second fan located adjacent said stale air outlet and operable to extract stale air from inside the room; and a counter flow heat exchanger located between said first and second ends, the heat exchanger including two separate flow paths therethrough, one connecting the fresh air inlet with the fresh air outlet and the other connecting the stale air inlet with the stale air outlet, the two flow paths being substantially parallel and separated from each other by a thermally conducting material across which, in use, heat exchange occurs between the fresh air and the stale air flowing in parallel but opposite directions.

The fans are preferably mounted side by side at one end of the heat exchanger. The resultant assembly is then most suitable for mounting in an enclosure in the form of a tubular air tunnel member which is preferably adjustable in length to suit varying wall or window thicknesses, for example between double glazing. A suitable tube arrangement is two concentric tubes in sliding interengagement with a seal member between the tubes. The tubes may be circular in cross-section, but are more preferably rectangular in cross-section.

Preferably the hat exchanger comprises an assembly of stacked thermally conducting sheets.

The sheets, which may be of metal, plastics, or metallised plastics, are each substantially rectangular with two short shaped edges and two long edges but with each long edge actually comprising two separate edges which meet externally of the basic rectangula shape.

The heat exchanger preferably comprises an alternately interleaved stacked arrangement of two different types of plates. The two types of plates are of similar design and preferably both have a series of parallel hollow ribs extending from their upper surfaces and running generally parallel to the two short sides of each plate. The ribs on the two types of plates are formed slightly differently, in that the ribs on the first type of plate are laterally offset from the ribs of the second type of plate preferably by a distance of half the spacing between the ribs.

In use, stale air and fresh air flows through the channels between the ribs, the fresh air travelling in one direction and being separated by the plates from the stale air which travels in a parallel but opposite direction. The offset arrangement of the ribs of adjacent sheets forces the air flowing between two adjacent plates to flow along the channels provided by the hollow ribs of the next plate directly above, thereby allowing effective heat exchange to occur between the fresh and stale air, through the walls of the hollow ribs. For this purpose, the walls of the ribs are made much thinner than the rest of the plate.

Preferably a spray suppression member is provided between the heat exchanger and the fans to ensure excessive moisture is not allowed to pass the fans and their associated motors. A similar spray suppression member may also be provided at the room side of the heat exchanger, and also if necessary at the outer end of the assembly. The spray suppression members are preferably condensate spray suppression members which include drains at the base connected to the outside end of the unit so that water may be drained away. The condenstae spray suppression member is preferably an open high porosity element having 90% or greater voids which acts also to suppresss noise.

Preferably the enclosure is arranged to have a downward slope towards the outside so that water is drained outwards from the unit.

The fans are resiliently mounted within the case to reduce structure borne vibration. However, condensing water vapour from the cooling exhaust stream would collect within the case, therefore the condensed water is allowed to escape through a hole in the case, the hole being plugged with a high porosity open structure which allows the migration of water through it (like a wick in an oil lamp), but provides a very high resistance to air flow. Thus the fans are sealed against unwanted air leakage but will allow the passage of condensed water vapour. Alternatively, a wick may be provided which allows migration of water from the inside of the apparatus to the outside.

Externally and internally the device is equipped with louvres to direct the warm and cold air streams in such a way as to minimise air recirculation.

According to a further aspect of the present invention there is further provided a method of exacting stale air from inside a room and introducing fresh air into the room, the method comprising drawing fresh air, by means of a first fan, through a fresh air inlet in a first end of an enclosure mounted in a wall or window of the room, passing said fresh air through a counter flow heat exchanger in a first direction to exit from a fresh air outlet in a second end of said enclosure, and simultaneously drawing stale air, by means of a second fan, through a stale air inlet in said second end of said enclosure, passing said stale air through the heat exchanger in a second direction opposite but parallel to said first direction to exit from a stale air outlet in said first end of said enclosure, whereby heat exchange is effected in counter flow fashion between said fresh air and said stale air.

Embodiments of the present invention will now be described by way of example only with reference to the accompanying drawings in which.

Figure 1:
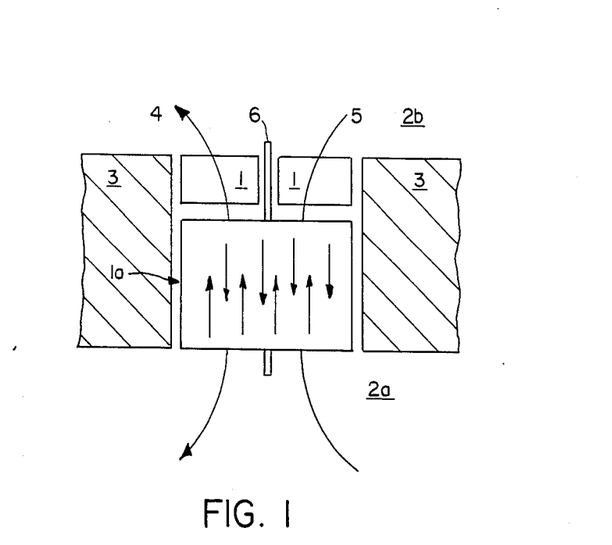
FIG. 1 shows a schematic diagram of the layout of the apparatus according to the present invention in a typical installation.

Referring to FIG. 1, apparatus according to the present invention comprises a ventilator unit 1a which is placed within the body of a wall 3 or window (not shown) in order to allow stale air to be extracted from the inside 2a of the room and replaced by fresh air from the outside 2b of the room. Two fans 1 are mounted side by side within the ventilator unit at the end of the unit closest to the outside 2b.

In order to achieve heat exchange between the outgoing (usually warm) air stream 4 and the incoming (usually colder) air stream 5, a heat exchanger 2 is located within the ventilator unit between the fans 1 and the inside of the room 2a. The two air streams 4 and 5 are separated by an internal dividing plate 6 which prevents mixing of the two airstreams.

Figure 2:
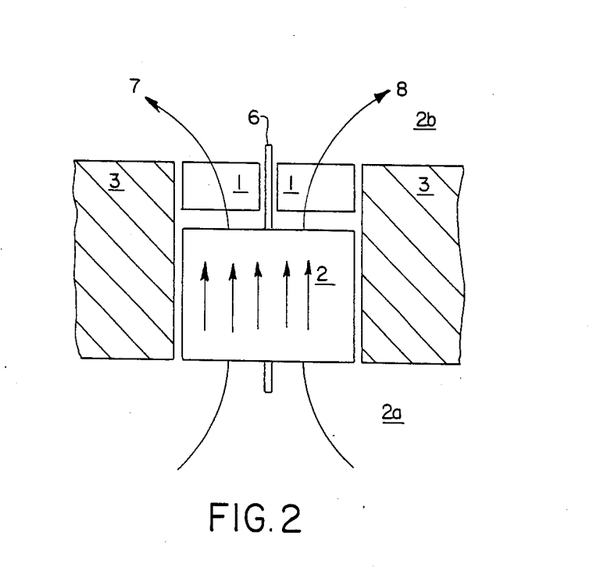
FIG. 2 shows the apparatus according to the present invention being operated in the purge mode.

In normal operation, the fans 1 are driven in opposite directions so that one extracts air from the room and the other introduces fresh air into the room. However, the direction of one of the fans may be reversed so that both fans are extracting air from the room. This is termed "a purge mode", and the unit is operated in this mode to blow collected dust and debris outside of the room. The purging mode is shown schematically in FIG. 2 with both airstreams 7, 8 leaving the room.

Figure 3:
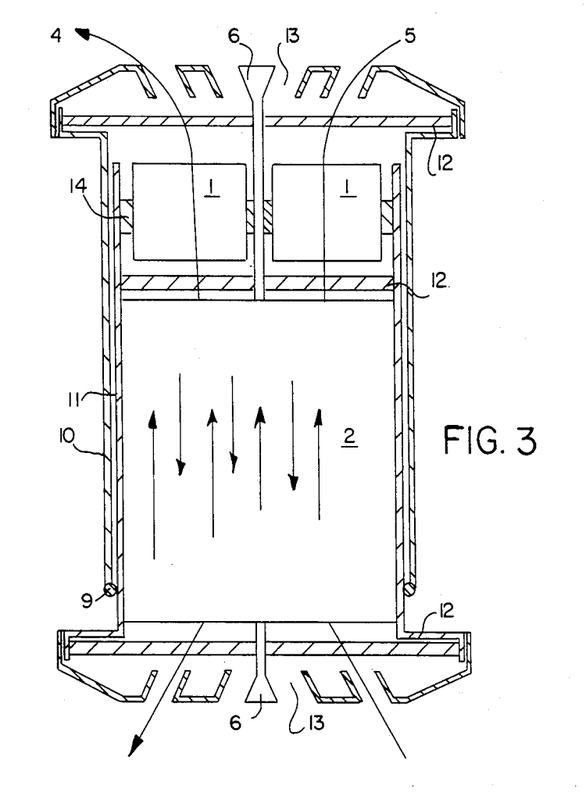
FIG. 3 shows a cross section of the apparatus shown in FIGS. 1 and 2 as seen from above.

Referring now to FIG. 3, a casing for the ventilator unit comprises an inner flanged open ended tube 11 which is surrounded over most of its surface by an outer open ended flanged tube 10, the two tubes being sealed by a sliding elastomeric ring 9. The ends of both tubes are closed by louvered air distributing grills 13, and the two airstreams 4, 5 are separated by a separator 6 which is adjustable in length.

The fans 1 are situated at the end of the tube 11 furthest away from the flange and are resiliently mounted there.

The heat exchanger 2 (to be described in more detail below) is situated within the inner tube 11 and is in intimate contact along its length with the tube 11.

Spray and mist suppresing porous elements 12 are situated at the ends of the ventilator and between the fans 1 and the heat exchanger 2.

Figure 4:
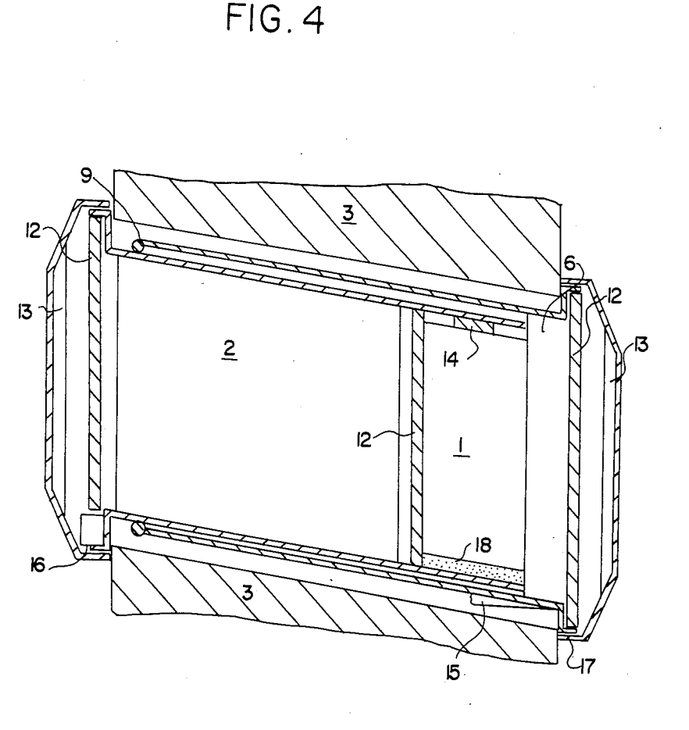
FIG. 4 shows a cross section of the apparatus shown in FIGS. 1 and 2 as seen from the side.

Referring to FIG. 4 which is a vertical cross-section through a ventilator unit, the unit is arranged so that when it is installed in a wall or window, the tubes 10, 11 are inclined at an angle 15 to the horizontal. This enables condensed and/or inducted water to drain away to the outside of the room through drain hole 17 which is plugged by an absorbent member. A further absorbent member 18 may be located beneath the fans, and this member 18 also offers high resistance to airflow. The member 18 serves to assist drainage of water from the ventilator to the outside.

The control electronics which operate the fans 1 and their direction of rotation is situated in a housing 16 and connected to the fans 1 by wires (not shown).

Referring to FIGS. 5, 6, 9 and 10, a preferred embodiment of the heat exchanger 2 comprises a number, typically 70 to 90, of stacked thin sheets 20 which are preferably injection moulded from plastics material.

Figure 5:
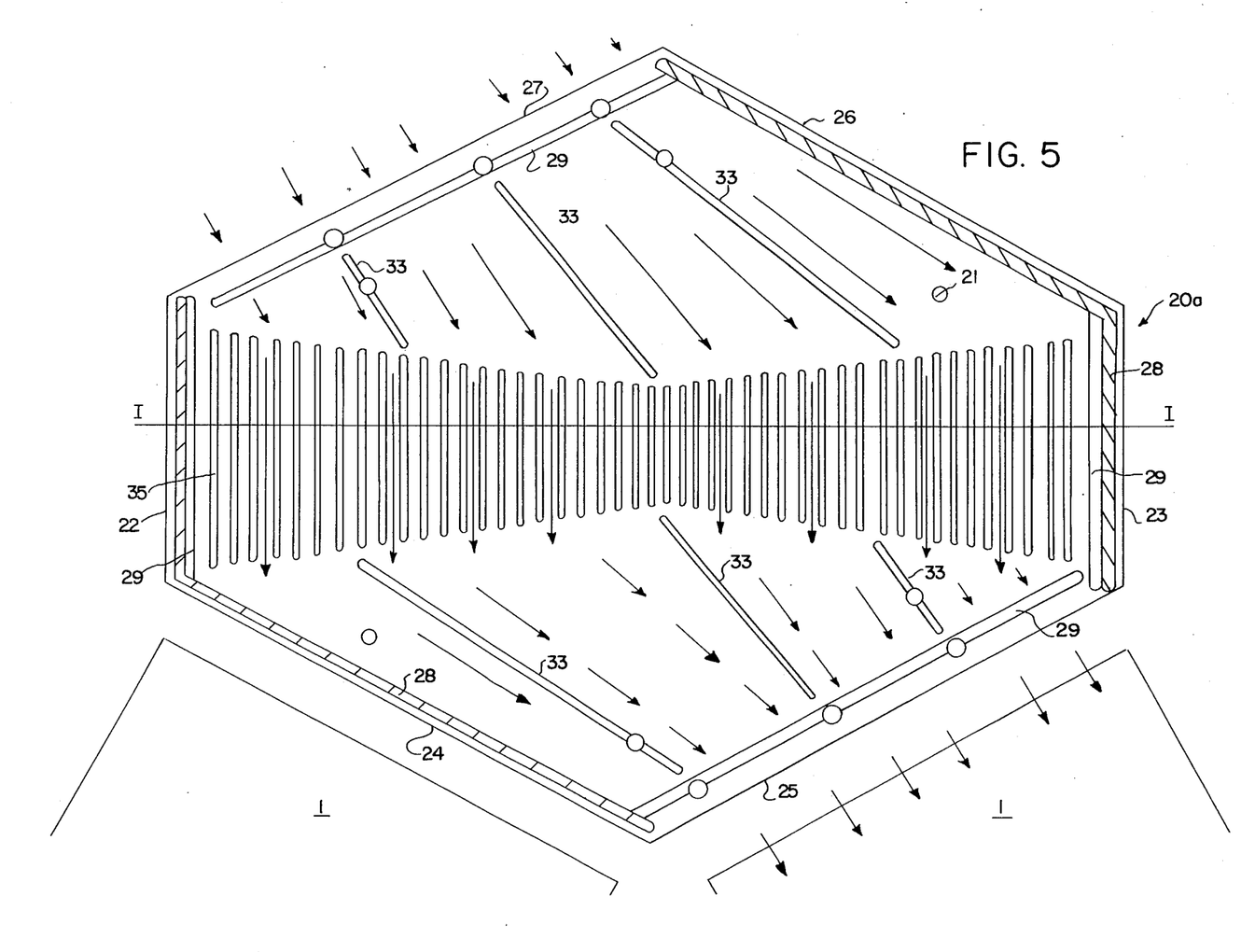
FIG. 5 is a top plan view of one type of plate forming part of the heat exchanger.
Figure 6:
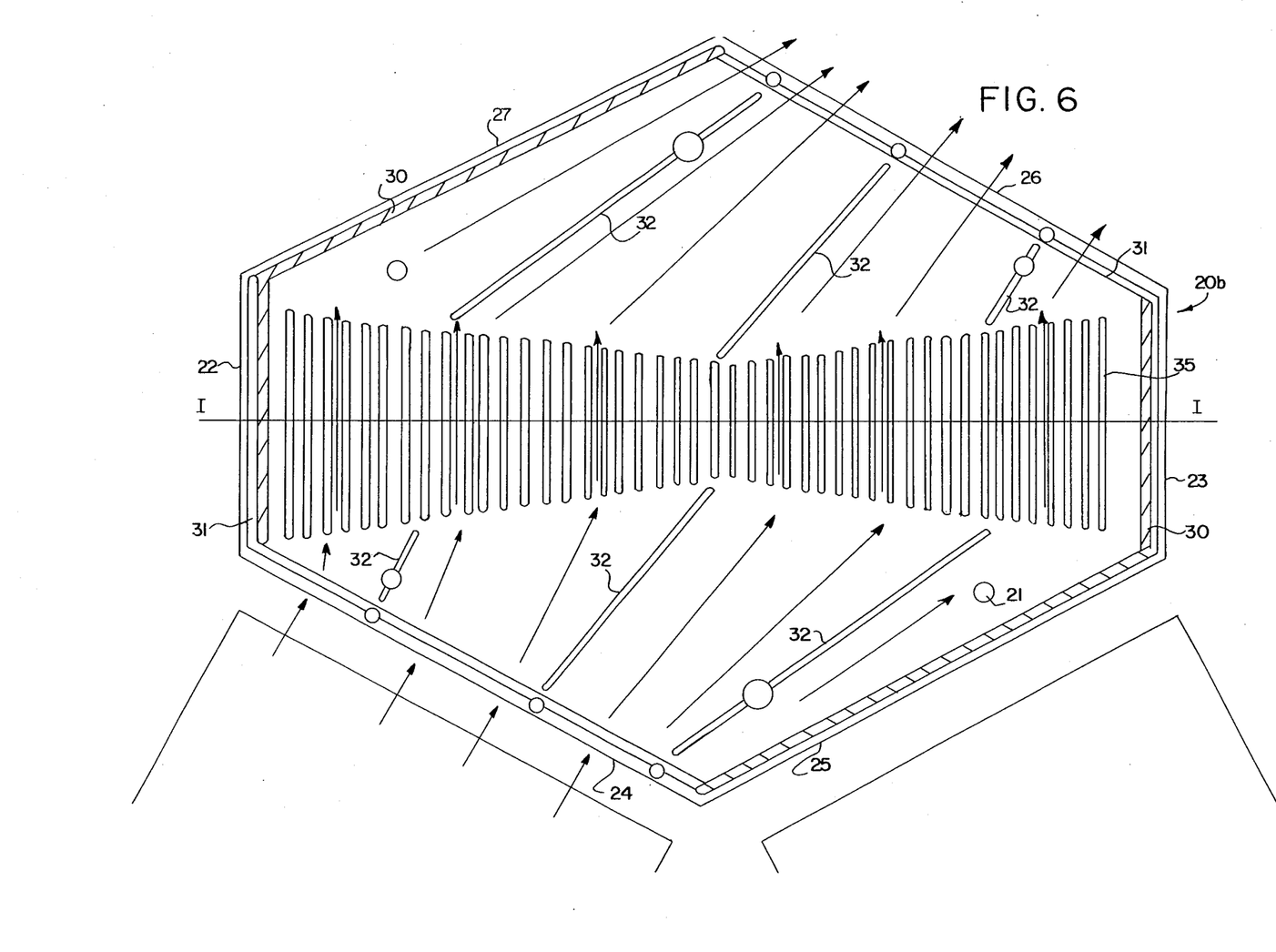
FIG. 6 is a top plan view of the other type of plate forming part of the heat exchanger.

The sheets 20 are of two types, 20a and 20b, referred to as even and odd numbered sheets, which are stacked alternatively to form the heat exchanger. A top plate and a base plate are placed on top and beneath the stack, and all the components are held together by needles passing through holes 21.

Referring to FIG. 5, which illustrates an even numbered plate 20a, the plate has two short edges 22,23 and two longer edges each comprising two outwardly inclined edges 24, 25 and 26, 27 respectively. The two fans 1 are located adjacent edges 24, 25 and substantially parallel to said edges. The central region of the plate is formed in a series of laterally spaced hollow parallel ribs 35 which extend parallel to the edges 22, 23. The ribs are not of uniform length, but are longer towards the edges 22, 23 than in the centre, thus having an advantageous effect to be described later.

Figure 8:
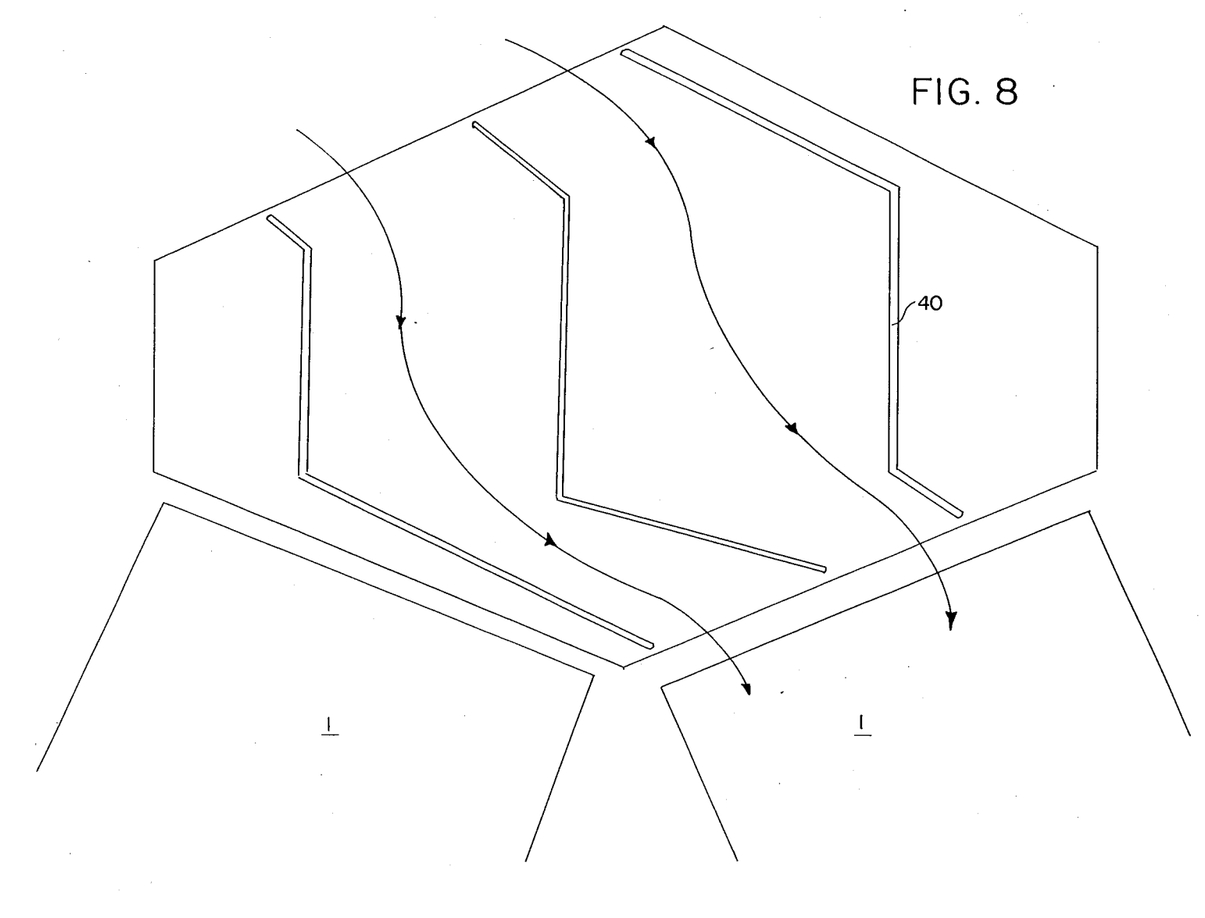
FIG. 8 is a top plan view of another alternative type of plate.

Referring to FIG. 6 which illustrates an odd numbered plate 20b, this plate has a similar configuration to that shown in FIG. 5, but the ribs are laterally offset from the ribs in the even numbered plate by one half of the distance between the ribs, to give the arrangement shown in FIG. 8 when the plates are stacked together.

Plate 20a is provided along edges 24, 22 and 26, 23 with a raised hollow wall 28, and along edges 27, 25 and 22, 23 with a channel 29 which protrudes beneath the undersurface of the plate.

Plate 20b is provided along edges 22, 27 and 25, 23 with a raised hollow wall 30, and along edges 26, 23 and 24, 22 with a channel 31 which protrudes beneath the undersurface of the plate. When the plate 20b is placed on top of plate 20a, the downwardly protruding surface of channels 31 fits snugly against walls 28 on the upper surface of plate 20a thus effectively sealing off edges 22, 24 and 26, 23 to air flow, whereas edges 27 and 25 remain open to air flow.

When another plate 20a is placed on top of existing plates 20a and 20b, the downwardly protruding surface of channels 29 fits snugly against walls 30 on the upper surface of plate 20b, thus effectively sealing off edges 25, 23 and 27, 22 against air flow.

Figure 10:
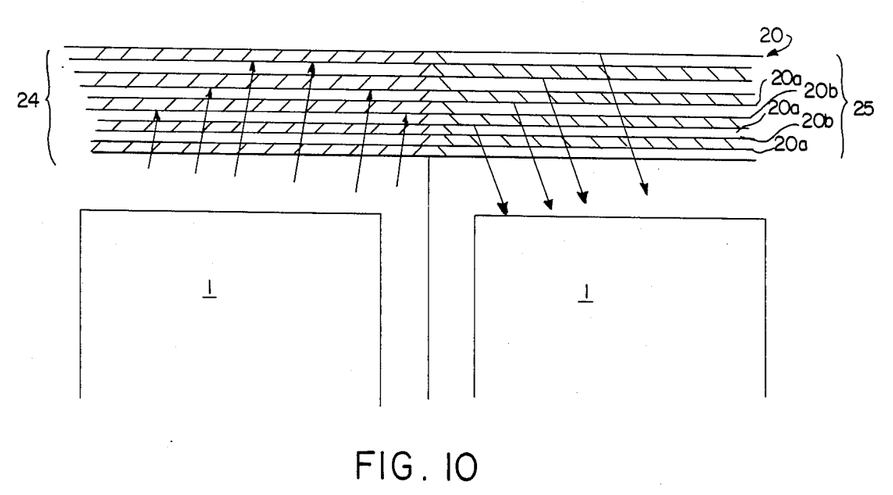
FIG. 10 is a cross section along line I—I of FIGS. 5 and 6, through the stack of plates.

Thus, as is shown in FIG. 10, when plates 20a and 20b are stacked alternatively, the walls and channels engage to seal off the first, third, fifth etc spaces between the plates along edges 24 and 26 and to seal off the second, fourth, sixth etc spaces between the plates along edges 25 and 27. This causes cool, fresh air to enter the stack through the second, fourth, sixth etc spaces between edges 24, the air then spreads out and is directly by directional ribs 32 to flow between the ribs 35 and is directed by directional ribs 32 to exit from the stack through the second, fourth and sixth etc spaces between edges 26. At the same time, warm, stale air enters the stack through the first, third, fifth etc spaces between edges 27, spreads out and is directed by directional ribs 33 to flow between the ribs 35 in counter flow against the cool air travelling in the opposite direction, and is directed by directional ribs 33 to exit from the stack through the first, third and fifth etc spaces between edges 25.

Thus, counter flow heat exchange occurs between the rib walls, which are substantially thinner than the rest of the plate.

The "butterfly" arrangement of longer ribs towards edges 23, 22 ensures that as the central region becomes fouled by debris the resistance to air flow in this central region increases and the air then flows towards the edges 22, 23 and there encounters longer flow paths through the heat exchange region to compensate for lost efficiency due to fouling.

Figure 7:
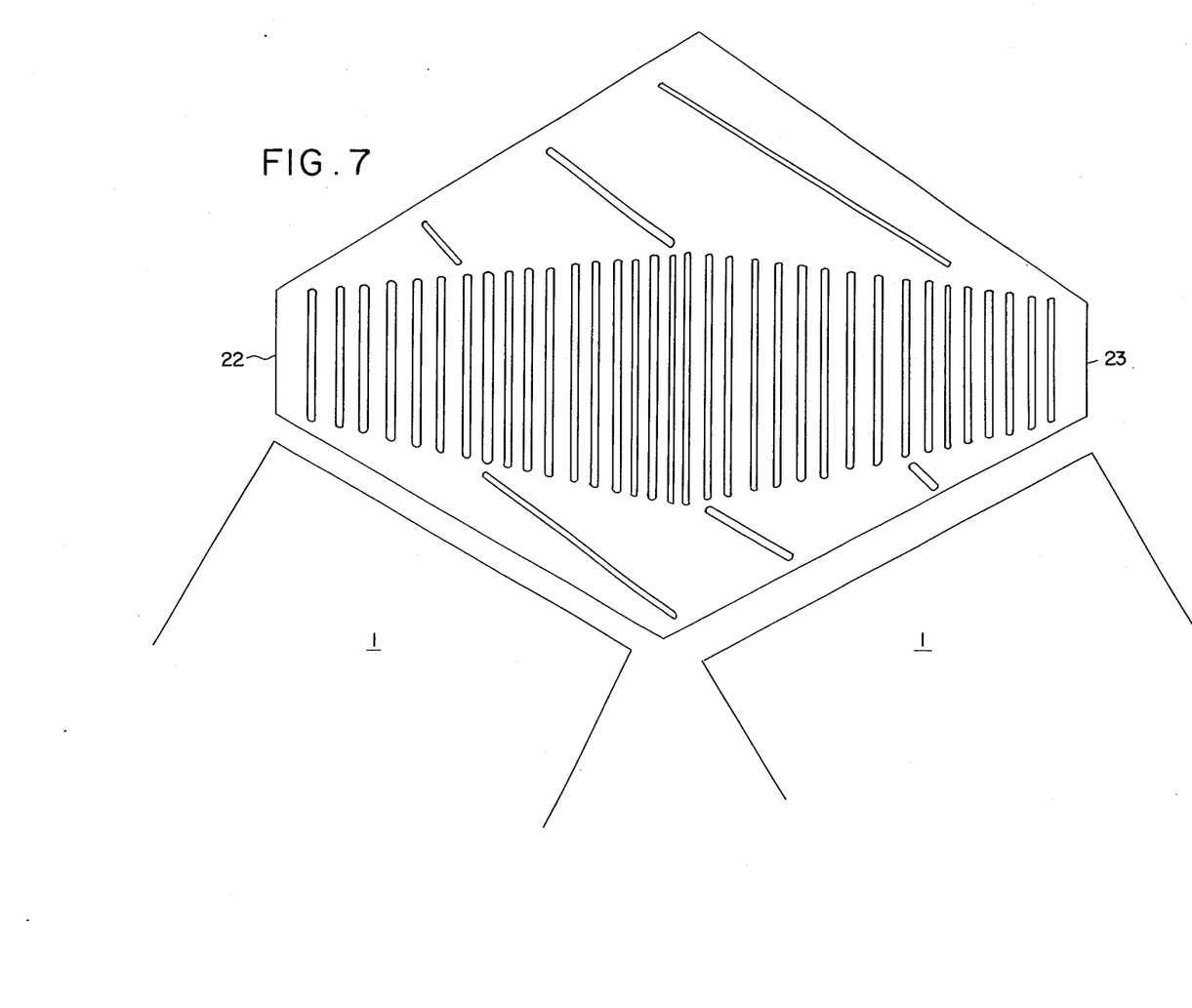
FIG. 7 is a top plan view of an alternative type of plate.

Alternatively, the ribs may be longer in the centre and shorter towards the edges, as indicated in FIG. 7. Whichever arrangement is used, the flow resistance over the whole unit remains constant as the degree of fouling increases.

Figure 9:
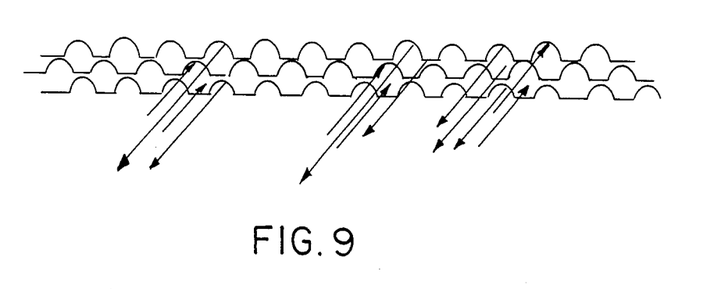
FIG. 9 shows the alternately stacked arrangement of the plates shown in FIGS. 5 and 6.

FIG. 9 illustrates the effect of the lateral offset of the ribs of adjacent plates. The air flows not only between the ribs of a plate, but also flows along the channels formed by the hollow ribs of the plate immediately above, so that at least some of the warm and cool air flows side by side as well as above and below. Thus, the ribs 35 serve the dual purpose of directing the air flow to ensure true counter flow heat exchange and ensuring high efficiency of heat exchange by bringing the warm air as close as possible to the cool air and by providing an increased area of heat exchange surface.

It should be appreciated that the plates may be of any size and any number of plates may be employed according to the particular application.

The ventilator unit according to the present inention has been measured as working at 80% efficiency, based on the difference in temperature between the incoming fresh air and outgoing stale air. Whilst the ribs provide good efficiency of heat exchange, they also create quite a high resistance to air flow. This can be alleviated, with a slight loss of efficiency, by providing, instead of a large number of ribs, a few, well spaced apart guiding ribs 40, as shown in FIG. 8.

We claim:

1. Apparatus for extracting stale air from inside a room and introducing fresh air into the room, the apparatus comprising:
    an enclosure adapted to be mounted within a wall or window of the room with a first end open to the exterior of the room and a second end open to the interior of the room;
    a fresh air inlet and a stale air outlet located at said first end;
    a stale air inlet and a fresh air outlet located at said second end;
    a first fan located adjacent said fresh air inlet and operable to introduce fresh air into the room.;
    a second fan located adjacent said stale air outlet and operable to extract stale air from inside the room; and
    a counter flow heat exchanger located between said first and second ends, the heat exchanger including two separate flow paths therethrough, one connecting the fresh air inlet with the fresh air outlet and the other connecting the stale air inlet with the stale air outlet, the two flow paths being substantially parallel to each other and extending perpendicularly to the wall in which it is adapted to be installed, and being separated from each other by a thermally conducting material across which, in use, counter flow heat exchange occurs between the fresh air and the stale air flowing in parallel but opposite directions.

2. Apparatus according to claim 1 in which the heat exchanger is provided with alternately interleaved first and second types of plates, each plate bearing a series of laterally spaced apart parallel hollow ribs extending from one end of the heat exchanger to the other along said flow paths and the ribs of each plate of the first type being laterally offset from the ribs of each adjacent plate of the second type.

3. Apparatus according to claim 2, in which the lateral spacing between the ribs of the plates of the first type and the ribs of the adjacent plate of the second type is equal to one half of the spacing between the ribs of each plate.

4. Apparatus according to claim 2, in which the wall thickness of the hollow ribs in each plate is considerably less than the thickness of the rest of the plate to promote heat exchange through the walls of the ribs.

5. Apparatus according to claim 1, in which the plates are vertically spaced apart to allow air flow therebetween, the space between any two adjacent plates being sealed on one side of the heat exchanger at one end thereof and sealed on the opposite side of the heat exchanger at the other end thereof, thereby forming two separate flow paths for the fresh and stale air.

6. Apparatus according to claim 1, in which the two fans are mounted side by side at the first end of the enclosure.

7. Apparatus according to claim 1, in which the enclosure is adjustable in length to suit varying wall or window thicknesses.

8. Apparatus according to claim 1, in which a spray suppression member is provided between the heat exchanger and the fans.

9. Apparatus according to claim 1, in which the enclosure slopes downwardly towards the first end thereof.

10. A method of extracting stale air from inside a room and introducing fresh air into the room, the method comprising drawing fresh air, by means of a first fan, through a fresh air inlet in a first end of enclosure mounted in a wall or window of the room, passing said fresh air through a counter flow heat exchanger in first direction perpendicular to said wall or window to exit from a fresh air outlet in a second end of said enclosure, and simultaneously drawing stale air by means of a second fan, through a stale air inlet in said second end of said enclosure, passing said stale air through the heat exchanger in a second direction opposite but parallel to said first direction and perpendicular to said wall or window to exit from a stale air outlet in aid first end of said enclosure, whereby heat exchanger is effected in counter flow fashion between said fresh air and said stale air.

11. Apparatus for extracting stale air from inside a room and introducing fresh air into the room, the apparatus comprising:

an enclosure adapted to be mounted within a wall or window of the room with a first end open to the exterior of the room and a second end open to the interior of the room;

a fresh air inlet and a stale air outlet located at said first end;

a first fan located adjacent said fresh air inlet and operable to introduce fresh air into the room;

a second fan located adjacent said stale air outlet and operable to extract stale air from inside the room; and a counter flow heat exchanger located between said first and second ends, the heat exchanger comprising alternatively interleaved first and second types of plates, each plate bearing a series of laterally spaced apart hollow ribs extending from one end of the heat exchanger to the other, the ribs of each plate of the first type being laterally offset from the ribs of each adjacent plate of the second type.

* * * * *